(12) United States Patent
Romano

(10) Patent No.: US 8,666,372 B2
(45) Date of Patent: Mar. 4, 2014

(54) METHOD AND APPARATUS FOR NOTIFYING A USER OF PRESENCE INFORMATION

(75) Inventor: Guy G. Romano, Elmhurst, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1104 days.

(21) Appl. No.: 12/348,512

(22) Filed: Jan. 5, 2009

(65) Prior Publication Data

US 2010/0173616 A1 Jul. 8, 2010

(51) Int. Cl.
*H04M 3/42* (2006.01)

(52) U.S. Cl.
USPC .............. 455/414.1; 455/404.2; 455/412.1; 455/414.2

(58) Field of Classification Search
USPC ............... 455/404.2, 407, 408, 414.1, 414.2, 455/456.1, 457, 412.1
See application file for complete search history.

(56) References Cited

U.S. PATENT DOCUMENTS

| | | | |
|---|---|---|---|
| 6,658,095 B1 | 12/2003 | Yoakum et al. | |
| 7,227,937 B1 | 6/2007 | Yoakum et al. | |
| 7,386,871 B1 | 6/2008 | Knudson et al. | |
| 7,433,922 B2 | 10/2008 | Engstrom | |
| 7,796,190 B2 * | 9/2010 | Basso et al. | 348/445 |
| 7,823,073 B2 * | 10/2010 | Holmes et al. | 715/753 |
| 7,917,583 B2 * | 3/2011 | Angiolillo et al. | 709/204 |
| 2003/0208545 A1 | 11/2003 | Eaton et al. | |
| 2004/0172455 A1 | 9/2004 | Green et al. | |
| 2004/0194146 A1 * | 9/2004 | Bates et al. | 725/110 |
| 2004/0231003 A1 * | 11/2004 | Cooper et al. | 725/135 |
| 2005/0227676 A1 * | 10/2005 | DeVries | 455/414.1 |
| 2006/0154650 A1 * | 7/2006 | Sherman et al. | 455/412.2 |
| 2007/0016649 A1 | 1/2007 | Nishiki | |
| 2007/0099683 A1 * | 5/2007 | Trice et al. | 463/1 |
| 2007/0101368 A1 | 5/2007 | Jacoby et al. | |
| 2007/0168463 A1 * | 7/2007 | Rothschild | 709/217 |
| 2007/0192409 A1 | 8/2007 | Kleinstern et al. | |
| 2007/0274486 A1 * | 11/2007 | Kister | 379/142.06 |
| 2009/0254823 A1 * | 10/2009 | Barrett | 715/716 |
| 2009/0299968 A1 * | 12/2009 | Green et al. | 707/3 |
| 2010/0169934 A1 * | 7/2010 | Kennedy | 725/62 |

OTHER PUBLICATIONS

Bentley, et al., "Sharing Motion Information with Close Family and Friends," Proceedings of the SIGCHI Conference on Human Factors in Computing Systems (CHI'07), San Jose, California, USA, ACM, Apr. 2007, pp. 1361-1370.

(Continued)

*Primary Examiner* — Cong Tran

(57) ABSTRACT

A method and apparatus for displaying presence information for buddies who are at a particular televised event is provided herein. During operation location information for a remote device is received by a presence server. A database is then accessed to determine if the location maps to a TV venue such as a sports stadium. If a match is found between the location of the remote device and its database of venues then currently-available multimedia content is analyzed to determine if an event is being broadcast at that venue at the current time. If it is determined that an event is being broadcast at the venue, then presence data is transmitted to the users having the user of the remote device as part of their buddy list. This causes the users to display the presence information on an ambient display, a display device, an electronic program guide, a banner, or in a list.

10 Claims, 3 Drawing Sheets

(56) References Cited

OTHER PUBLICATIONS

Lawton, "New Television Ventures Promise to Bring the Community-building Features of the Web into Your Living Room," The Wall Street Journal, Tech, http://online.wsj.com/article/SB122461909287855339.html, downloaded Oct. 29, 2008, 4 pages.
Flickr, "ZoneTag: Photos and Talk of the ZoneTag Prototype/Discuss," http://www.flickr.com/groups/zonetagusers/discuss/72157594258417964/, downloaded Dec. 30, 2008, 2 pages.
CenceMe, "Home page and Description," http://cenceme.org/, downloaded Dec. 30, 2008, 8 pages.
Tomas Dolezel, "European Search Report ," European Patent Office, Munich, Germany, Apr. 26, 2010, 7 pages, whole document.

* cited by examiner

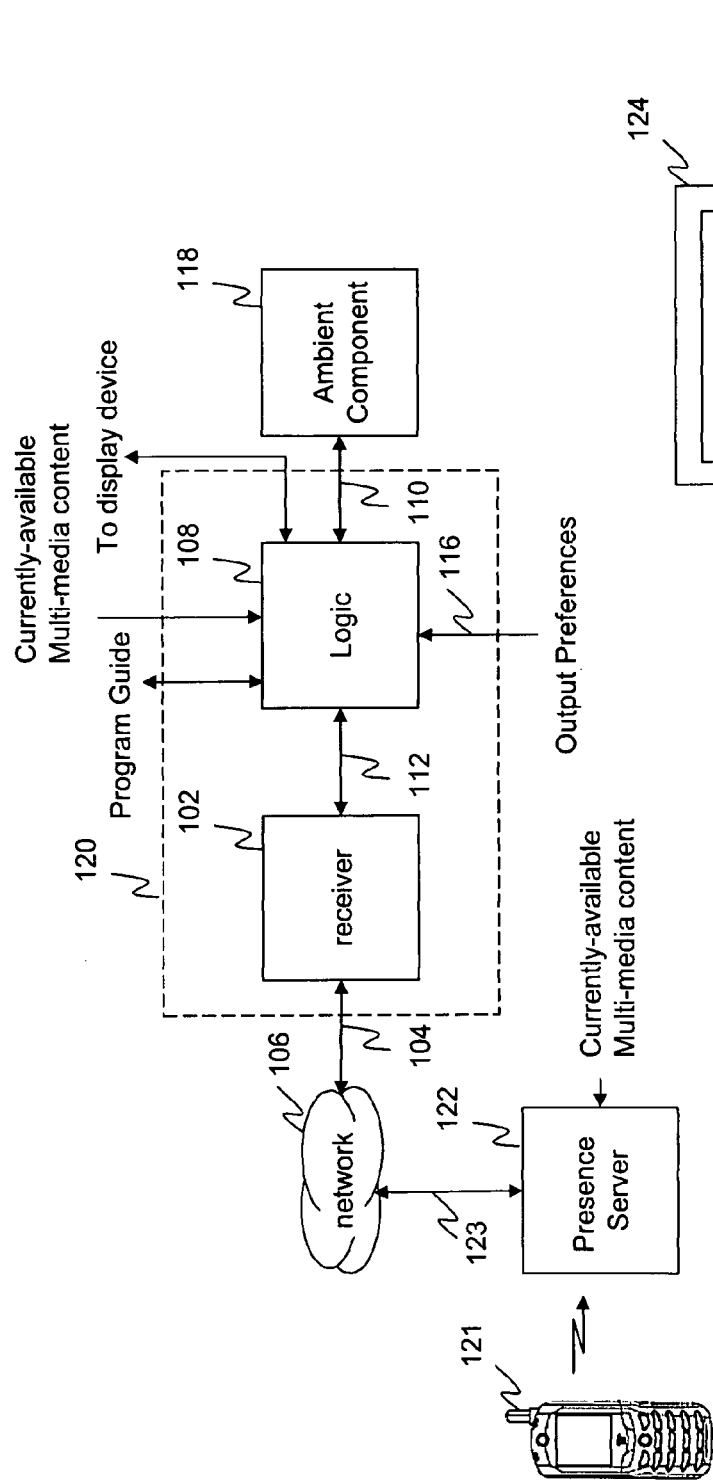

METHOD AND APPARATUS FOR NOTIFYING A USER OF PRESENCE INFORMATION

FIELD OF THE INVENTION

The present invention relates generally to the field of media broadcast receivers, such as televisions. The present invention is more particularly directed to displaying presence information for buddies who are at a particular event.

BACKGROUND OF THE INVENTION

During research into social TV, it was discovered that people recalled times when they were watching a TV program at home while communicating with a friend who was physically at the same event. People found this type of interaction to be positive. One participant recalled watching the Southside Irish Parade while receiving text messages from a friend who was at the Southside Irish Parade. Current presence mechanisms lack the ability to automatically map a person's physical presence back to a televised event.

This is best explained with an example. In prior-art systems a person can set up a buddy list and get TV presence information regarding what her/his buddies are currently watching. If a buddy is watching ESPN for example, then the presence information regarding that buddy can be displayed in a number of ways. The program guide can be modified to show that the buddy is watching ESPN. A channel banner at the bottom of the screen can be created to show which buddy is watching the same channel. The buddy list itself can be modified to show what programs each person is currently watching. The prior art is limited to generating this TV presence information based on what channel a person is currently tuned to. Thus, current presence mechanisms lack the ability to automatically map a person's physical presence back to a televised event. Therefore, a need exists for a method and apparatus for notifying a person of presence information that maps a buddy to a particular event, and particularly, notifies a person when their buddies are at events that are televised.

BRIEF DESCRIPTION OF THE DRAWINGS

FIG. 1 is a block diagram of a system in accordance with the present invention.

FIG. 2 is a block diagram of an example embodiment in accordance with the present invention.

Figure 3:
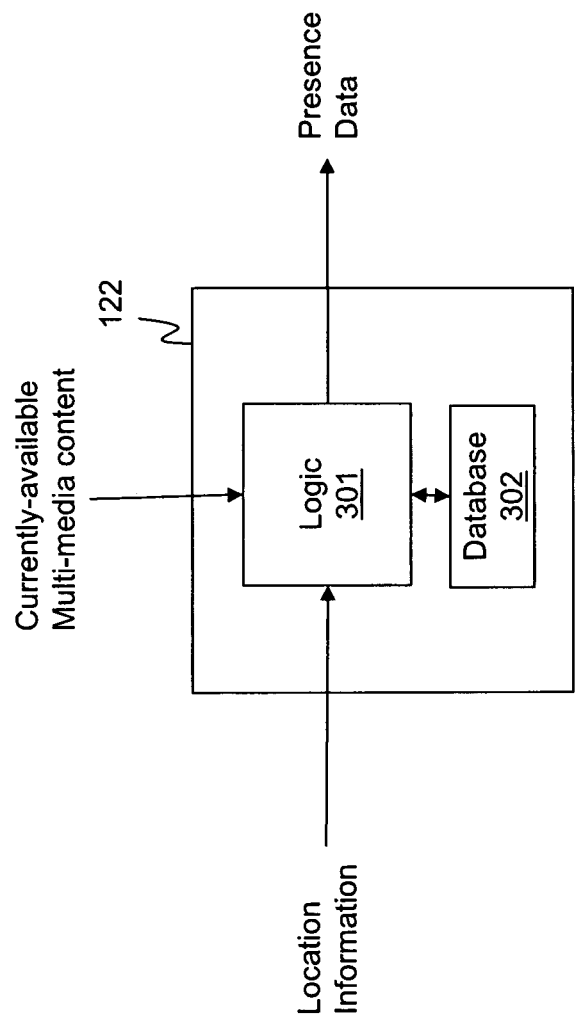
FIG. 3 is a block diagram of the presence server of FIG. 1 and FIG. 2.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to address the above-mentioned need, a method and apparatus for displaying presence information for buddies who are at a particular televised event is provided herein. During operation location information for a remote device is received by a presence server. A database is then accessed to determine if the location maps to a TV venue such as a sports stadium. If a match is found between the location of the remote device and its database of venues then currently-available multimedia content is analyzed to determine if an event is being broadcast at that venue at the current time. If it is determined that a live event is being broadcast at the venue, then presence data is transmitted indicating that the user of the remote device is at the event. This information is then shared with others who wish to receive the presence information of the user of the remote device. This can include persons who have the remote user as part of their buddy list. This causes the display of presence information on an ambient display, a display device, an electronic program guide, a banner, or a buddy list.

It should be noted that the description that follows teaches how to notify a person when a buddy is at, or near, an event that is currently being televised. One of ordinary skill in the art will recognize that such information may be displayed in any number of ways. However, for simplicity, the use-case is described where the notification is provided to an ambient component that is external to a media broadcast receiving device (e.g., a television). However, in alternate embodiments the information may be displayed via other techniques. For example, this information may be conveyed within a modified program guide to show that the buddy is at a televised event. A channel banner at the bottom of the screen can be created to show this information. The buddy list itself can be modified to show what televised events each buddy is currently attending.

Turning now to the drawings, wherein like numerals designate like components, FIG. 1, a block diagram of system 100 used to display a person's presence at a televised event. System 100 provides status information associated with televised events that buddies are currently attending. The types of events may include, but are not limited to sporting events, news-worthy events, parades, concerts, cultural events, and plays.

System 100 includes a receiver 102 which is capable of receiving presence data or updates via link 104 from network 106. Network 106 may comprise any Wide Area, or Local Area Network capable of transmitting data. The presence data is associated with a current location of remote device 121. Remote device 121 identifies and provides the location of a remote person to presence server 122. This location may be provided, for example, as a latitude and longitude of device 121, cell phone tower identification, or local beaconing from venue. Examples of remote devices 121 that may provide location information include, but are not limited to, any device having a GPS receiver, cellular telephones, laptop computers, portable computers, personal digital assistants, networked entertainment devices such as MP3 players, and portable video viewers.

System 100 further includes processor 108 that generates an ambient command 110 based on the presence data. Processor 108 comprises logic circuitry such as a digital signal processor (DSP), general purpose microprocessor, a programmable logic device, or application specific integrated circuit (ASIC) and is utilized to control ambient component 118. If logic circuitry 108 is separate from the receiver 102, then logic circuitry 108 may receive the presence data from the receiver via link 112. Ambient command 110 is used to control ambient component 118 with ambient commands that represent aggregate presence information of at least one buddy who is at a broadcast event, and utilizes pre-attentive processing to provide the information.

Logic circuitry 108 also serves to decode available multimedia content and provide the decoded content to a display device.

Multi-media content include analog or digital media content that may be stored at a variety of location or received from a variety of sources. For one embodiment, a broadcast program may be received from a multimedia broadcast providing multiple channels, in which each channel may be tuned at a particular frequency range. For another embodiment, a broadcast program may be stored at a digital video recorder, such as its hard drive or other storage device. The source(s) of content of one or more of these embodiments include, but are not limited to, traditional broadcast, video on demand, IPTV, Internet download, Internet streaming, pod casting, and the like.

If the presence information received from network 106 is for only one remote device at a broadcast program, then logic circuitry 108 provides an ambient command will represent that particular presence information. If the presence information of more than one remote device at more than one broadcast program is received from network 106, then the ambient command will represent the presence information of these devices and/or programs. Of course, the ambient command may also aggregate other types of information that are available, as describe herein. Accordingly, the ambient command is an abstracted form of the presence data that represents simple, non-textual properties representing change. Examples of simple, non-textual properties include, but are not limited to, color, light intensity, sound, motion tactile feedback, scent, and the like.

Logic circuitry 108 generates the ambient command by processing the presence data in combination with other data, such as the currently-available multi-media content. Logic circuitry 108 may further generate the ambient command based on currently-available multi-media content and in combination with output preferences. Output preferences may be stored in a memory and provided to logic circuitry 108 via link 116. Logic circuitry 108 is capable of customizing the ambient command 110 based on the capabilities specific to ambient component 118, as identified by the output preferences. Ambient component 118 provides an ambient representation of the presence information based on the ambient command 110 of logic circuitry 108, so that the ambient command may be perceived at-a-glance by a person. Ambient component 118 will change state in response to receiving the ambient command 110.

It should be noted that receiver 102, logic circuitry 108, and/or ambient component 118 may be located within a cable set-top box 120. FIG. 1 shows only receiver 102 and logic 108 existing within set-top box 120.

In another embodiment, the remote device will only send presence updates to the presence server if it determines that it can convert its current location to a TV presence event. In this embodiment the remote device would not rely on the presence server to help map its location to a TV event. Instead, the remote device would directly access sources such as upcoming.com, school websites, city event guide, community theatre sites, program guides, metadata from video sources, etc. to help map its physical location to a new TV presence state.

It should also be noted that in an alternate embodiment, logic circuitry 108 utilizes other techniques to notify a person of a buddies presence information. For example, logic circuitry 108 may modify a stored program guide to show that a buddy is at a televised event. In another embodiment, a channel banner can be created by logic circuitry 108 and output to a display device to show this information. In yet another embodiment, logic circuitry 108 may modify the buddy list itself to show what televised events each buddy is currently attending.

Referring to FIG. 2, there is shown system 200 for providing presence information for buddies who are at a particular event. System 200 includes a client device, such as set-top box 120, coupled to a local display 124 that is capable of displaying media broadcast programs, such as a television capable of displaying television shows. Set-top box 120 is configured to receive multiple broadcast programs from a remote source, such as a national or regional broadcasting company, and provide a local subset of the broadcast programs to the local display 124. For example, set-top box 120 may include a tuning circuit (not shown) that selects the local subset of the broadcast programs based on one or more frequencies associated with the local subset. The local subset may only include one channel tuned at a particular frequency range or, as explained above, may include more than one channel with each channel tuned to a particular frequency range. System 200 may further include an ambient component 118 configured to receive presence information from set-top box 120 and provide an ambient command representative of an abstract form of the presence information. For example, ambient component 118 may include multiple light sources, and the ambient command may determine which light source or light sources may be illuminated. Also, ambient component 118 may include a single light source or multiple light sources, in which each light source may change color and/or intensity of illumination based on the ambient command. Further, ambient component 118 may provide audio and/or motion output instead of, or in addition, to visual output. For example, ambient component 118 may have shape-changing characteristics, such as an animatronics puppet, and sounds. Ambient component 118 may provide light, color, sound, movement/shape changing, changing graphical icons on a display, and the like. In addition, for another embodiment, where multiple ambient components exist, the client device may send presence information based on predetermined criteria, such as sending commands to the ambient component closest to the client device. The client device and ambient component may provide information other than the presence information, such as the state of the client device, information about the content (e.g., genre, title) selected by the local user or a remote user, and additional information that is not directly related to the media broadcast.

It should be noted that ambient component 118 may be separate from set-top box 120 and/or the local display 124, as shown in FIG. 2, or the device may be an integral part of set-top box 120 and/or the local display so that the ambient command may be observed from an external area of set-top box 120. If separate, then ambient component 118 may communicate with set-top box 120 via a wired or wireless communication link. For example, ambient component 118 may be a home WiFi solution, a wireless serial connection, a wireless USB connection, or through broader networks such as cellular, WiMAX, etc. Also, the client device, such as set-top box 120, may communicate directly with ambient component 118, or indirectly through one or more intermediate devices, such as a server which re-broadcasts messages from the client device to one or more ambient components. As alternatives to the client device and the local display, ambient component 118 may also be integrated with other devices, such as microphones, remote controls or wireless communication devices.

During operation of system 200, remote device 121 periodically provides presence server 122 with its current location via a wireless link. Presence server 122 additionally receives the currently-available multi-media content along with location information for certain multi-median events. For example, presence server 122 might receive such information as "NFL football game, Chicago Bears-vs-Dallas Cowboys on ESPN network at Chicago, location=Latitude 41° 51' 46.00", Longitude 87° 36' 40.32 W. Presence server 122 will then determine those remote devices that are in the vicinity (e.g., ½ mile) of Latitude 41° 51' 46.00", Longitude 87° 36' 40.32 W. Presence server 122 will then provide this information to those persons having remote device 121 in their buddy list. Thus, for example, if remote device 121 was in the vicinity of Latitude 41° 51' 46.00", Longitude 87° 36' 40.32 W, presence server 122 would notify all persons having remote device 121 as a buddy of the presence of remote device 121 near an event broadcast on the ESPN network.

In an alternative approach, remote device 121 will only update the presence server when a new presence state has been determined.

FIG. 3 is a block diagram of the presence server of FIG. 1 and FIG. 2. As shown, server 122 comprises logic circuitry 301 and database 302. Logic circuitry comprises circuitry such as a digital signal processor (DSP), general purpose microprocessor, a programmable logic device, or application specific integrated circuit (ASIC) and is utilized to control presence server 122. Database 302 comprises standard random access memory and is used to store information related to persons and their associated buddies. Database 302 also serves to store coordinates that map to a TV venue such as sports stadiums. So for example, database 302 may have Soldier Field, Latitude 41° 51' 46.00", Longitude 87° 36' 40.32 W as a data entry. This database can be updated from a variety of sources including but not limited to metadata from video feeds, program guide information, etc.

Figure 4:
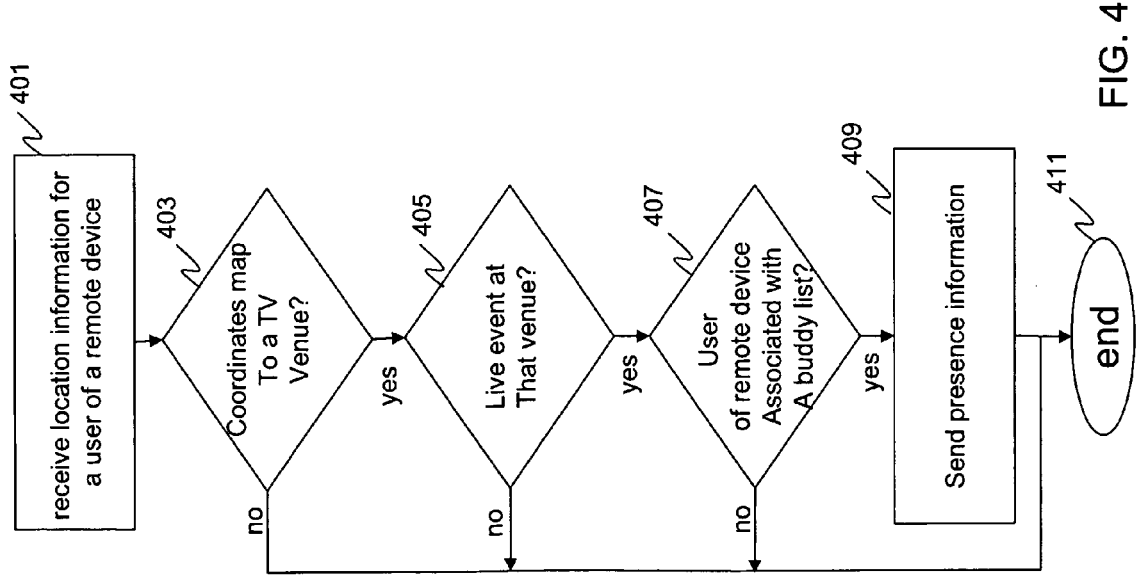
FIG. 4 is a flow chart showing operation of the presence server of FIG. 3.

FIG. 4 is a flow chart showing operation of the presence server of FIG. 3. During operation logic circuitry 301 receives location information for a first person by receiving location information from a remote device operated by the first person (step 401). As described above, preferably the location information comprises latitude and longitude information of the device's current location, however in alternate embodiments other presence information may be used. Steps 403 and 405 are performed in order to determine if the first person is at a live, televised event. In particular, at step 403 logic circuitry 301 accesses database 302 to determine if those coordinates (i.e., the location of the first person) map to a location that may be broadcast live, such as a sports stadium. If a match is found between the location of the remote device and its database of venues then the logic flow continues to step 405 where logic circuitry 301 analyzes currently-available multimedia content to determine if a live event is being broadcast at that venue at the current time. The currently-available multi-media content may be provided to logic circuitry 301 as a guide database, which are typically used by computers and set top boxes to populate their Electronic Program Guides. This information may also be stored in database 302.

Continuing, if at step 405 it is determined by logic circuitry 301 that a live event is being broadcast at the venue, then the logic flow continues to step 407 where logic circuitry 301 determines if the first person (i.e., the user of the remote device) is associated with any person's buddy list. If so, the logic flow continues to step 409 where the presence data is transmitted only to the persons having the user of the remote device as part of their buddy list. The data is transmitted via network 106. As discussed above, the presence data notifies at least a second person that the first person is at the live televised event, and the notification causes modification of an ambient display, a display device, an electronic program guide, a banner, or a buddy list to reflect the fact that the first person is at the live televised event. The logic flow then ends at step 411.

Figure 5:
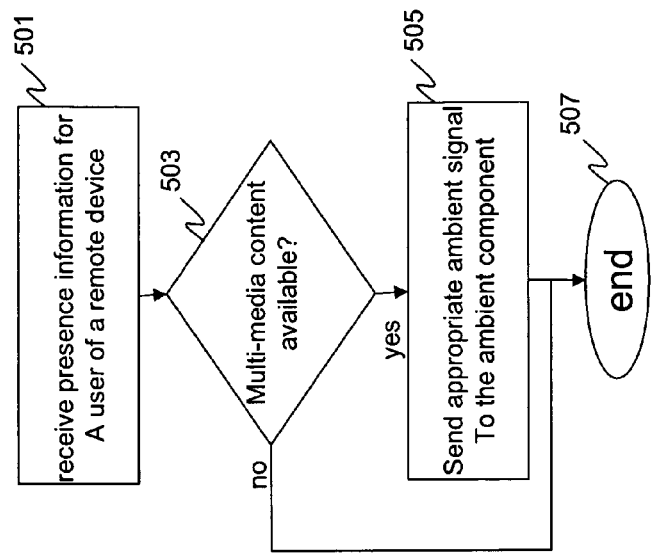
FIG. 5 is a flow chart showing operation of the set-top box of FIG. 1 and FIG. 2.

FIG. 5 is a flow chart showing operation of the set-top box of FIG. 1 and FIG. 2. The logic flow begins at step 501 where presence data is received by receiver 102 for a buddy. As discussed above, the information is preferably received from network 106 and comprises an identification of a person and a televised event. At step 503 logic circuitry 108 analyzes currently available multi-media to determine if the live event is available. If so, the logic flow continues to step 505 where an appropriate ambient signal is sent to ambient component 118 causing the ambient component to indicate that the person is at the televised event. It should be noted that in an alternate embodiment, step 505 may comprise logic circuitry 108 modifying a program guide, a channel banner, or a buddy list to indicate that the buddy is at the televised event televised event. The logic flow then ends at step 507.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention. For example, while the above description has been given with a person being notified that an individual is attending a "live" event, one of ordinary skill in the art will recognize that the above technique may be utilized to notify persons that an individual was at a past event which is currently being broadcast. In addition although the above description was given with respect to such things sports "venues", it is understood that a venue may comprise any televised location or event (e.g., a fire, a protest, a newsworthy event, . . . etc.). In covering such venues, database 302 may be updated in real time so that spontaneous events are utilized. It is intended that such changes come within the scope of the following claims:

What is claimed is:

1. A method for notifying a second person of presence information of a first person, the method comprising the steps of:
   receiving a location of the first person, wherein the first person is a buddy on a buddy list;
   determining if the first person is at a televised event, including:
   determining if the location of the first person maps to a particular broadcast venue; and
   determining if an event is being broadcast at the particular venue; and notifying the second person that the first person is at the televised event, wherein the notification causes modification of presence information on a display device or an ambient display.

2. The method of claim 1 wherein the step of notifying causes the modification of presence information on an electronic program guide, a banner, or a buddy list.

3. The method of claim 1 wherein the step of receiving the location of the first person comprises the step of receiving latitude or a longitude of the first person.

4. The method of claim 1 wherein the step of notifying the second person that the first person is at the televised event comprises the step of:
   determining that the second person has the first person on their buddy list; and
   notifying the second person only when it has been determined that the second person has the first person on their buddy list.

5. The method of claim 4 wherein the step of notifying comprises the step of notifying via a Wide Area or Local Area Network.

6. An apparatus for notifying a second person of presence information of a first person, comprising:
   logic circuitry receiving a location of the first person, determining if the first person is at a televised event, including:
   determining if the location of the first person maps to a particular broadcast venue; and
   determining if an event is being broadcast at the particular venue, and notifying the second person that the first person is at the televised event, wherein the notification causes modification of a display device or an ambient display.

7. The apparatus of claim 6 wherein the notification causes modification of an electronic program guide, a banner, or a buddy list.

8. The apparatus of claim 6 wherein the step of receiving the location of the first person comprises the step of receiving latitude or a longitude of the first person.

9. The apparatus of claim 6 wherein the logic circuitry notifies the second person that the first person is at the televised event only when the second person has the first person on their buddy list.

10. The apparatus of claim 6 wherein the notifying comprises notifying via a Wide Area or Local Area Network.

* * * * *